US010669007B2

(12) United States Patent
Twelves et al.

(10) Patent No.: US 10,669,007 B2
(45) Date of Patent: Jun. 2, 2020

(54) METHOD AND APPARATUS FOR ATTACHING COMPONENTS HAVING DISSIMILAR RATES OF THERMAL EXPANSION

(71) Applicant: United Technologies Corporation, Farmington, CT (US)

(72) Inventors: Wendell V. Twelves, Glastonbury, CT (US); Kathleen E. Sinnamon, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 126 days.

(21) Appl. No.: 16/045,008

(22) Filed: Jul. 25, 2018

(65) Prior Publication Data

US 2018/0346097 A1    Dec. 6, 2018

Related U.S. Application Data

(62) Division of application No. 13/157,276, filed on Jun. 9, 2011, now Pat. No. 10,059,431.

(51) Int. Cl.
*F16B 5/02* (2006.01)
*B64C 9/02* (2006.01)
*F16B 43/00* (2006.01)

(52) U.S. Cl.
CPC .............. *B64C 9/02* (2013.01); *F16B 43/001* (2013.01); *F16B 5/0241* (2013.01); *Y10T 29/49952* (2015.01); *Y10T 403/217* (2015.01)

(58) Field of Classification Search
CPC ..... B64C 9/02; F16B 43/001; Y10T 29/49952
See application file for complete search history.

(56) References Cited

U.S. PATENT DOCUMENTS

| 1,596,856 | A | 8/1926 | Setlow |
| 3,016,746 | A | 1/1962 | Holloway |
| 3,070,953 | A | 1/1963 | Carrel |
| 3,675,376 | A | 7/1972 | Belew |
| 4,243,189 | A | 1/1981 | Ohgi |
| 4,243,192 | A | 1/1981 | Johnson |
| 4,312,599 | A | 1/1982 | Darolia |
| 4,411,594 | A | 10/1983 | Pellow et al. |

(Continued)

FOREIGN PATENT DOCUMENTS

| EP | 1152156 | 11/2001 |
| JP | S6256784 | 3/1987 |

OTHER PUBLICATIONS

European Search Report for European Patent Application No. 12170610.5 completed Nov. 4, 2016.

(Continued)

*Primary Examiner* — Jason L Vaughan
*Assistant Examiner* — Amanda Kreiling
(74) *Attorney, Agent, or Firm* — Carlson, Gaskey & Olds, P.C.

(57) ABSTRACT

An example method of mounting a first component to a second component includes receiving at least a fastening assembly within an aperture established in the first component, the fastening assembly coupled to the second component via a linking member, positioning a felt metal material between the fastening assembly and the first component, securing the fastening assembly, and compressing the felt metal material during the securing.

20 Claims, 4 Drawing Sheets

(56) References Cited

U.S. PATENT DOCUMENTS

| | | |
|---|---|---|
| 4,411,954 A | 10/1983 | Butch, III et al. |
| 4,450,687 A | 5/1984 | Cole |
| 4,556,591 A | 12/1985 | Bannink, Jr. |
| 4,689,928 A | 9/1987 | Dutton et al. |
| 4,834,569 A | 5/1989 | Foote et al. |
| 4,841,100 A | 6/1989 | Ignasiak |
| 4,861,229 A | 8/1989 | Halstead |
| 4,863,122 A | 9/1989 | Bolang et al. |
| 5,015,116 A | 5/1991 | Nardone et al. |
| 5,120,175 A | 6/1992 | Arbegast et al. |
| 5,228,795 A | 7/1993 | Gray |
| 5,718,531 A | 2/1998 | Mutschler, Jr. et al. |
| 5,829,253 A | 11/1998 | Long et al. |
| 6,012,610 A | 1/2000 | Pauser et al. |
| 6,045,291 A | 4/2000 | Ruehle et al. |
| 6,102,610 A | 8/2000 | Palusis et al. |
| 6,126,371 A | 10/2000 | McCloskey |
| 6,171,009 B1 | 1/2001 | Wright |
| 6,175,989 B1 | 1/2001 | Carpenter et al. |
| 6,398,450 B1 | 6/2002 | Jarvis |
| 6,425,829 B1 | 7/2002 | Julien |
| 6,679,062 B2 | 1/2004 | Conete et al. |
| 6,758,653 B2 | 7/2004 | Morrison |
| 6,895,761 B2 | 5/2005 | Mitchell et al. |
| 6,910,853 B2 | 6/2005 | Corman et al. |
| 7,416,362 B2 | 8/2008 | North |
| 7,422,403 B1 | 9/2008 | Johnson et al. |
| 7,647,779 B2 | 1/2010 | Shi et al. |
| 7,878,459 B2 | 2/2011 | Mabe et al. |
| 8,556,531 B1 | 10/2013 | Bird et al. |
| 2002/0100840 A1 | 8/2002 | Billinger et al. |
| 2003/0170092 A1 | 9/2003 | Chiodo et al. |
| 2006/0046039 A1 | 3/2006 | Krause |
| 2007/0158127 A1 | 7/2007 | Taguchi et al. |
| 2007/0212189 A1 | 9/2007 | Naitou |
| 2009/0028697 A1 | 1/2009 | Shi et al. |
| 2009/0035406 A1 | 2/2009 | Cleary, Jr. et al. |
| 2009/0205147 A1 | 8/2009 | Gil Coto et al. |
| 2009/0212158 A1 | 8/2009 | Mabe et al. |
| 2009/0226327 A1 | 9/2009 | Little et al. |
| 2009/0272122 A1 | 11/2009 | Shi et al. |
| 2010/0019096 A1 | 1/2010 | Pecora et al. |
| 2010/0050399 A1 | 3/2010 | Browne et al. |
| 2010/0104433 A1 | 4/2010 | Shi et al. |
| 2010/0202855 A1 | 8/2010 | Haasz et al. |
| 2010/0227698 A1 | 9/2010 | Keith et al. |
| 2010/0257864 A1 | 10/2010 | Prociw et al. |

OTHER PUBLICATIONS

European Search Report for European Patent Application No. 12170590.9 completed Nov. 14, 2016.

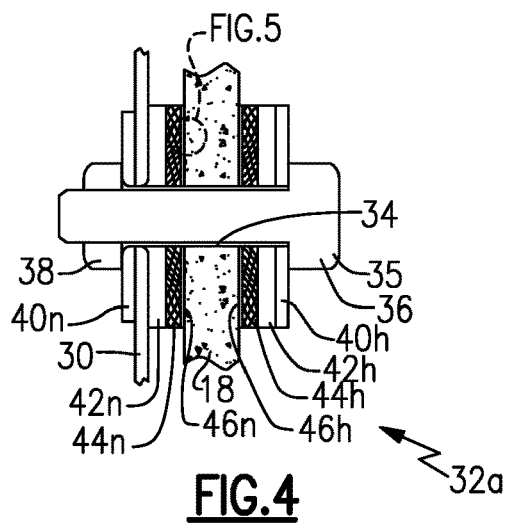
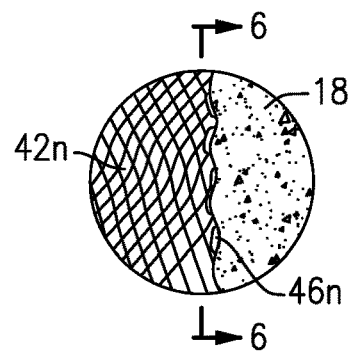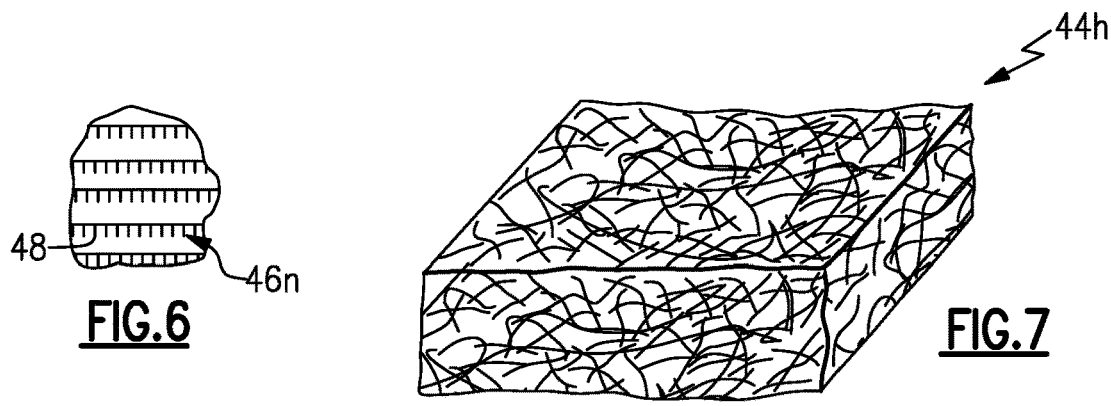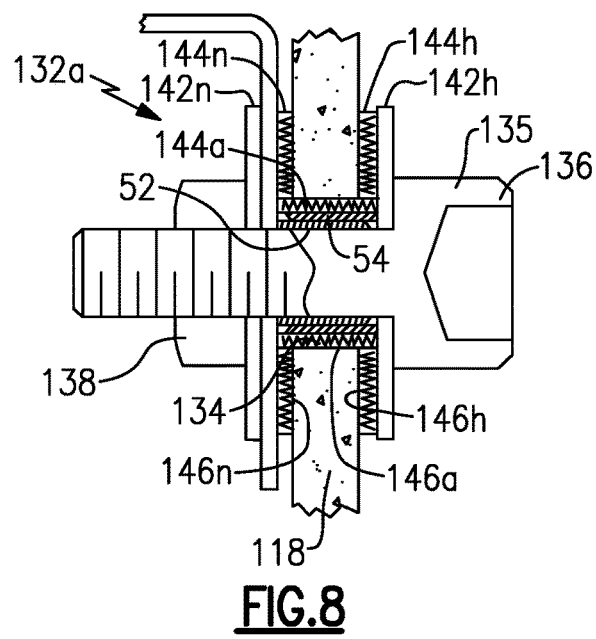

METHOD AND APPARATUS FOR ATTACHING COMPONENTS HAVING DISSIMILAR RATES OF THERMAL EXPANSION

CROSS-REFERENCE TO RELATED APPLICATIONS

This application is a divisional of U.S. patent application Ser. No. 13/157,276, which was filed on 9 Jun. 2011 and is incorporated herein by reference.

BACKGROUND

This disclosure relates generally to securing components and, more particularly, to securing components that have dissimilar coefficients of thermal expansion, components that are relatively brittle, or both.

As known, components having dissimilar coefficients of thermal expansion expand and contract at different rates in response to temperature fluctuations. Securing components having dissimilar coefficients of thermal expansion is difficult because the attachment strategy must accommodate the differing rates of expansion and contraction. Securing components having the same coefficient of thermal expansion is also difficult if the components are exposed to different temperatures. In addition, components well suited for high temperature environments often are brittle, which further complicates any strategy used to attach such components.

The high temperature environment of an aircraft includes many components having differing coefficients of thermal expansion. These components often need to be secured to each other. For example, within some aircraft, a ceramic matrix composite trailing edge assembly is secured to a metallic airframe bracket. The trailing edge assembly is typically made of a ceramic matrix composite material, which has a lower coefficient of thermal expansion than the, typically metallic, airframe bracket. As can be appreciated, securing such a trailing edge assembly to the airframe bracket is difficult due to the low mechanical strength of ceramic matrix composite materials and due to the growth and retraction of the trailing edge assembly relative to the airframe brackets. Components, like clamps, are often difficult to secure to the trailing edge assembly as it is typically brittle.

The differing rates of expansion and contraction between the trailing edge assembly and the airframe brackets have been accommodated by introducing slotted holes and flexures into the attachment strategy. These features offer limited positional precision, limited vibration resistance, and may not provide a rigid attachment. Attachment strategies must also withstand the high temperature environment and not damage the assembly or brackets.

SUMMARY

An example mounting assembly includes a fastener receivable within an aperture of a component. A felt metal gasket separates the fastener from the component.

An example mounting assembly includes a first component and a second component. A linking member has a first portion secured to the first component and a second portion secured to the second component. A fastener is used to secure the linking member to the first component. The fastener is received within an aperture of the first component. A felt metal gasket separates the fastener from the first component.

An example method of mounting a first component to a second component when the components have different coefficients of thermal expansion includes receiving a fastening assembly within an aperture established in the first component. The fastening assembly is coupled to the second component via a linking member. The method positions a felt metal material between the fastening assembly and the first component. The method secures the fastening assembly and compresses the felt metal material during the securing.

DESCRIPTION OF THE FIGURES

The various features and advantages of the disclosed examples will become apparent to those skilled in the art from the detailed description. The figures that accompany the detailed description can be briefly described as follows:

FIG. 4 shows a section view of an example mounting assembly used to secure a clamp to the FIG. 1 trailing edge structure.

FIG. 5 shows a close-up view of area 5 in FIG. 4.

FIG. 6 shows a section view at line 6-6 in FIG. 5 with a felt metal gasket removed.

FIG. 7 shows a perspective view of a portion of a felt metal gasket in the FIG. 4 mounting assembly.

FIG. 8 shows a section view of another example mounting assembly that incorporates a split sleeve.

DETAILED DESCRIPTION

Figure 1:
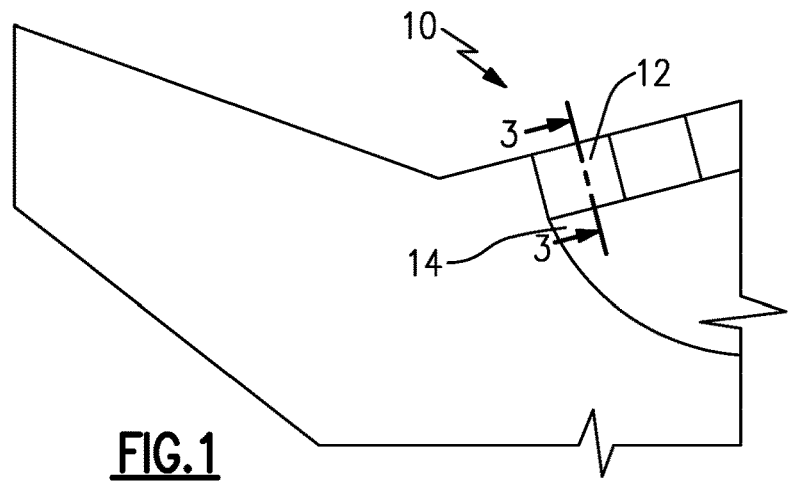
FIG. 1 shows a perspective view of a trailing edge assembly of an aircraft.
Figure 2:
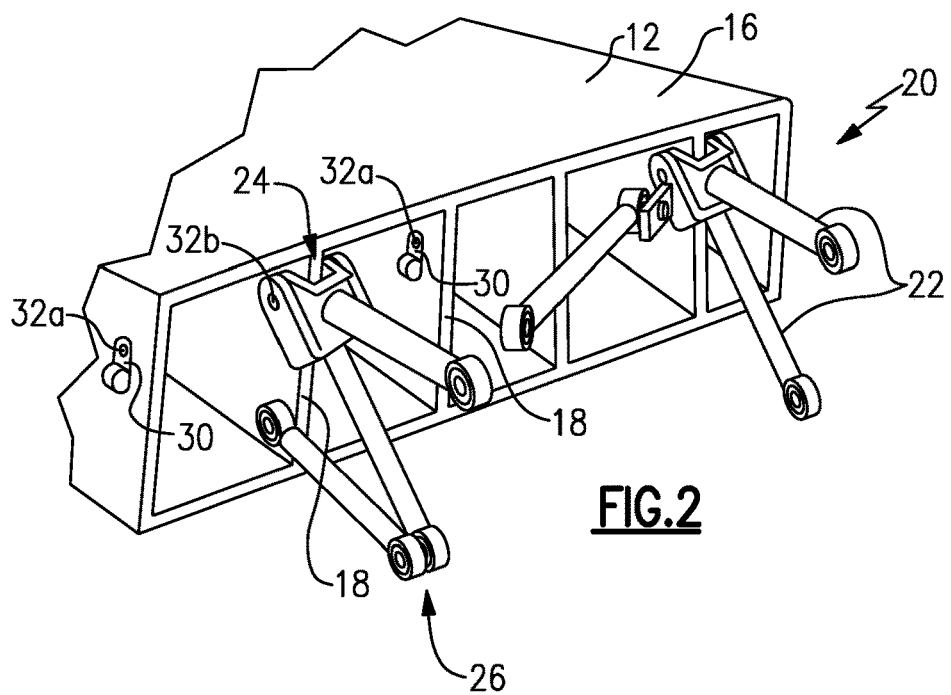
FIG. 2 shows an end view of the FIG. 1 trailing edge structure and an associated arrangement of linking members.
Figure 3:
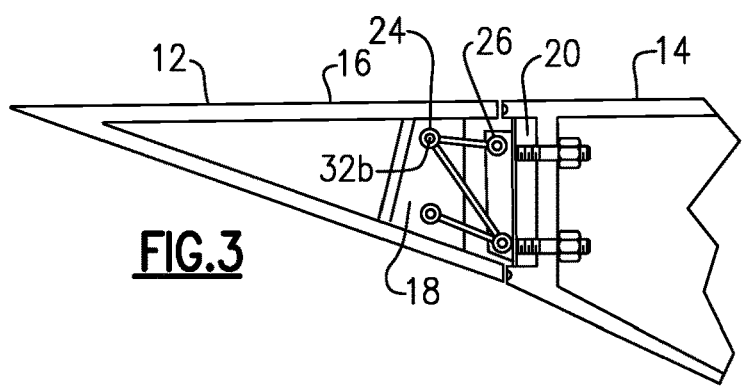
FIG. 3 shows a section view at line 3-3 in FIG. 1.
Figure 9:
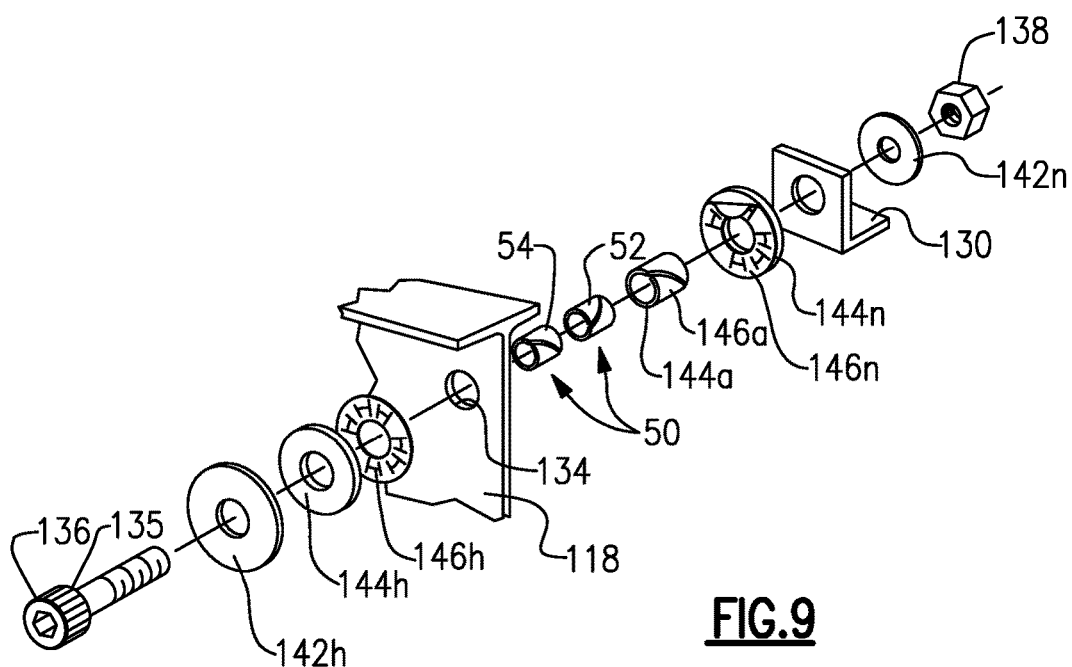
FIG. 9 shows an exploded view of the FIG. 8 assembly.
Figure 12:
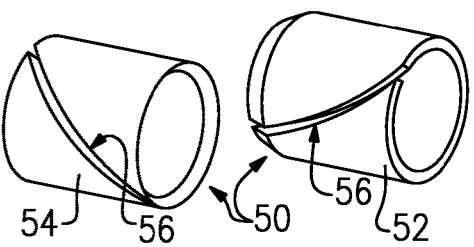
FIG. 12 shows a perspective view of portions of the split sleeve in FIG. 8.
Figure 10:
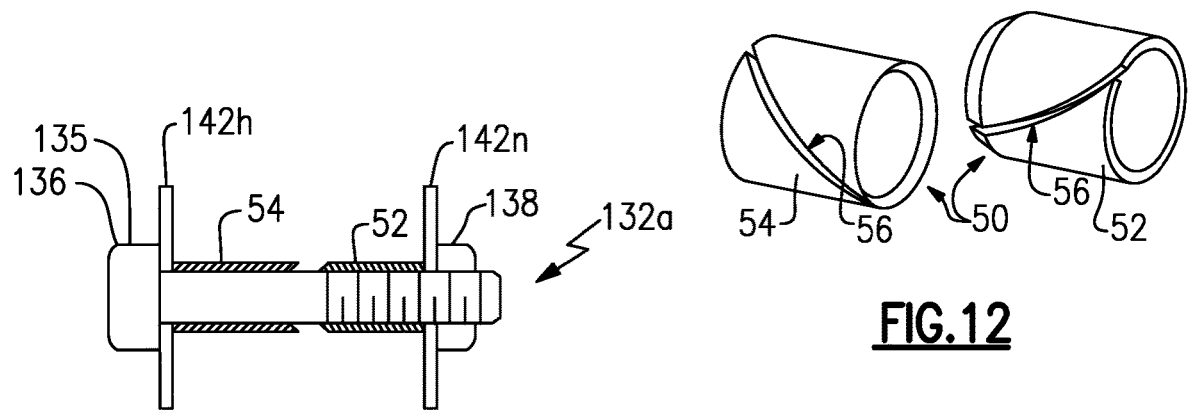
FIG. 10 shows a simplified version of the FIG. 8 assembly during an early stage of installation.
Figure 11:
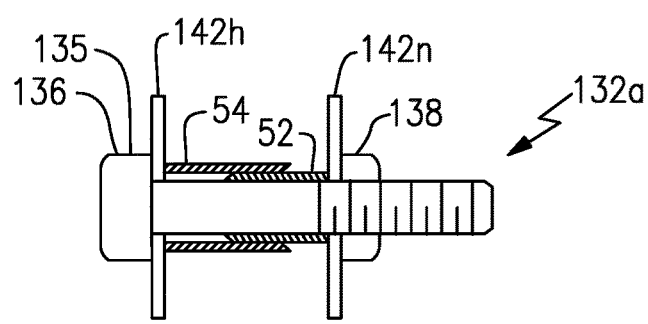
FIG. 11 shows a simplified version of the FIG. 8 assembly during a later stage of installation than FIG. 10.
Figure 13:
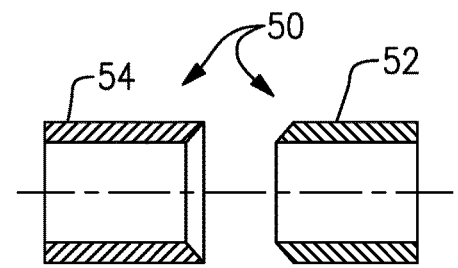
FIG. 13 shows section views of the portions of the split sleeve shown in FIG. 12.

Referring to FIGS. 1-3, in this example, an aircraft 10 includes a first component and a second component. The first component is a trailing edge assembly 12. The second component is an airframe structure 14. The trailing edge assembly 12 and the airframe 14 have different coefficients of thermal expansion. In one example, the trailing edge assembly 12 is a ceramic matrix composite component, and the airframe 14 is a metallic material. In another example, the first component and the second component have the same coefficient of thermal expansion, but are exposed to different temperatures.

The example trailing edge assembly 12 includes an outer shell 16 and ribs 18 spanning opposing walls of the outer shell 16. A mounting assembly 20 is secured to the ribs 18 to connect the trailing edge assembly 12 to the airframe 14. In this example, the mounting assembly 20 includes a plurality of linking members 22. Each of the linking members 22 extends between a first end 24 and a second end 26. The first end 24 is secured to the ribs 18, and the second end 26 is secured to the mounting assembly 20.

In this example, a plurality of brackets 30 are also secured to the trailing edge assembly 12. The example brackets 30 are P-clamps used to support wiring, tubing, etc.

A plurality of fastening assemblies 32a and 32b engage the trailing edge assembly 12. In this example, the brackets 30 are each secured to the trailing edge assembly 12 with one the fastening assemblies 32a. The first ends 24 of the linking members 22 are secured to the trailing edge assembly 12 with one of the fastening assemblies 32b.

Referring now to FIGS. 4-7 with continuing reference to FIGS. 1-3, the example fastening assembly 32a extends through an aperture 34 established in one of the ribs 18 of the trailing edge assembly 12.

The example fastening assembly 32a includes a bolt 35 having a head 36. The fastening assembly 32a also includes a nut 38. A portion of the fastening assembly 32a is on a head side of the rib 18, and another portion of the fastening assembly 32a is on a nut side of the rib 18. Another portion of the fastening assembly 32a (the shank) extends through the aperture 34 and is radially spaced from the rib 18.

On the head side of the rib 18, a Belleville washer 40h, a flat washer 42h, a felt metal gasket 44h, and a foil layer 46h are clamped between the head 36 and the rib 18 when the bolt 35 and the nut 38 are tightened relative to each other. On the nut side of the rib 18, a Belleville washer 40n, a flat washer 42n, a felt metal gasket 44n, and a foil layer 46n are compressed against the wall as the bolt 35 is tightened relative to the nut 38. Also, on the nut side of the rib 18, a portion of the bracket 30 is clamped between the Belleville washer 40n and the flat washer 42n as the bolt 35 is tightened relative to the nut 38.

Tightening the bolt 35 relative to the nut 38 causes the flat washers 42h and 42n to compress the layers of the felt metal gasket 44h and 44n against opposing sides of the rib 18. As can be appreciated, the flat washers 42h and 42n distribute the load exerted on the rib 18 due to the bolt 35 tightening relative to the nut 38.

The example felt metal gasket 44h and 44n is made of non-woven or loosely packed metallic fibers. Candidate metal fiber materials include oxidation resistant materials such as stainless steel and Inconel alloys. Typical fiber diameters can range from 0.00015 inches to 0.005 inches (4 micrometers to 130 micrometers). Typically, the clamping bolt 35 should be retorqued at least twice over a twenty-four hour period to compensate for the relaxation that will exist as the metal fibers take a compression set.

The example rib 18 is made of a ceramic matrix composite material, which is a relatively brittle material prone to wear and damage, particularly when the mating surface is metal. The foil layer 46 prevents the fibers of the felt metal gasket 44h and 44n from directly contacting the rib 18, which could cut, or otherwise damage, the rib 18. As the layers of the felt metal gasket 44h and 44n are compressed toward the rib 18, the foil layers 46h and 46n are compressed against the surfaces of the rib 18. The foil layers 46h and 46n are between 0.002 to 0.003 inches (0.0508 to 0.0762 millimeters) thick in this example.

The surfaces of the rib 18 typically have many irregularities, which is another characteristic of ceramic matrix composite materials. The example foil layers 46h and 46n include a plurality of slices 48 that enhance the pliability of the foil layers 46h and 46n when compressed. That is, the slices 48 make the foil layers 46h and 46n more compliant. In one example, the slices 48 extend through the entire thickness of the foil layers 46h and 46n and establish flaps within the foil layers 46h and 46n. In another example, the slices do not extend through the entire thickness of the foil layers 46h and 46n instead are scored areas of the foil layers 46h and 46n.

The example fastening assembly 32a clamps the bracket 30 relative to the rib 18. Notably, only the foil layers 46h and 46n directly contact the rib 18. The conformance of the felt metal gaskets 44h and 44n to the surfaces of the rib 18, through the foil layers 46h and 46n, discourages movement of the bolt 35 radially toward a position where a shank of the bolt 35 would contact the rib 18. The shank of the bolt 35 is radially spaced from the rib 18 in this example.

During assembly of the fastening assembly 32a, it may be necessary to tighten the bolt 35 relative to the nut 38, and then retighten the bolt 35 relative to the nut 38 after some period of time. Retightening may be necessary due to the felt metal gaskets 44h and 44n relaxing.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Referring now to FIGS. 8-12 with continued reference to FIGS. 1-3, another example fastener assembly 132a is configured to secure the bracket 130 against the rib 118. The fastener assembly 132a includes a split sleeve assembly 50 configured to exert a radial force against a felt metal gasket layer 144a positioned within the aperture 134. The felt metal gasket layer 144a, when compressed, forces a foil layer 146a against portions of the rib 118 that define the aperture 134. The foil layer 146a is wrapped around the outer diameter of the felt metal gasket layer 144a prior to insertion into the aperture 134.

The example split sleeve assembly includes an inner sleeve 52 and an outer sleeve 54. As the bolt 135 is tightened relative to the nut 138, the flat washers 142h and 142n force the inner sleeve 52 axially toward the outer sleeve 54. The facing ends of the inner sleeve 52 and the outer sleeve 54 are beveled, which encourages the inner sleeve 52 to be received within the outer sleeve 54 after sufficient axial movement. In one example, the bevel of the inner sleeve 52 is between 30 and 60 degrees, and the bevel on the outer sleeve 54 is between 30 and 60 degrees.

The inner sleeve 52 and the outer sleeve 54 each include a slot 56 to accommodate movement of the inner sleeve 52 and the outer sleeve 54 as the inner sleeve 52 is received within the outer sleeve 54 during assembly. The slots 56 are helical slots in this example.

As the inner sleeve 52 is received within the outer sleeve 54, the outer sleeve 54 is forced radially outward away from the bolt 135. The movement of the outer sleeve 54 compresses the felt metal gasket 144a and forces the foil layer 146a against the rib 118. The felt metal gasket 144a blocks contact between the shank of the bolt 135 and the rib 118 within the aperture 134. Also, when the head 136 of the bolt 135 is sufficiently tightened relative to the nut 138, the flat washers 142h and 142n compress the felt metal gaskets 144h and 144n.

In this example, the axial length of the outer sleeve 54 and the inner sleeve 52 is less than the distance between the flat washers 142h and 142n when the bolt 135 is fully tightened relative to the nut 138. This ensures that contact between the flat washer 142h and the inner sleeve 52 does not prevent tightening of the bolt 135 relative to the nut 138. In one example, the inner sleeve 52 is spaced between 0.020 to 0.030 inches (0.508 to 0.762 millimeters) from the flat washer 142h when the bolt 135 is fully tightened relative to the nut 138.

Figure 14:
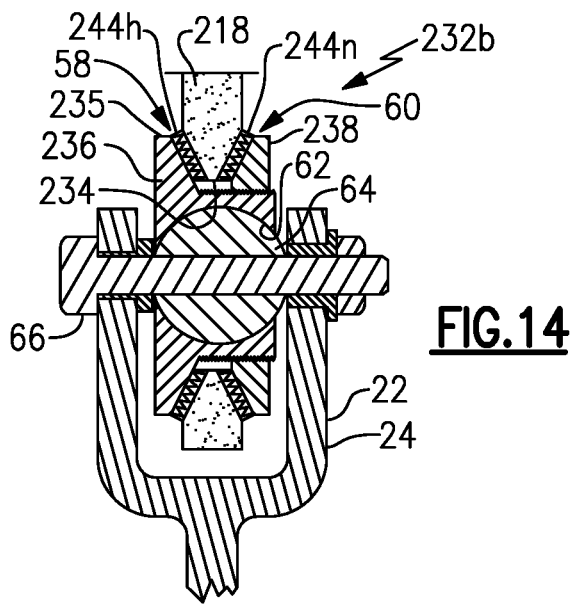
FIG. 14 shows a section view of another example mounting assembly that is partially conical.

Referring now to FIG. 14 with continuing reference to FIGS. 1-3, a fastening assembly 232b may be used to secure the first ends 24 of the linking members 22 to the trailing edge assembly 12. The head 236 of the example fastening assembly 232b is conical, as is the nut 238. In this example, the rib 218 is countersunk at areas 58 and 60 to accommodate the beveled portions of the head 236 and nut 238, respectively. The aperture 234 is chamfered at opposing axial ends because the rib 218 is countersunk at the areas 58 and 60. As can be appreciated, receiving the head 236 within the countersunk area 58 facilitates centering the bolt 235 when tightened relative to the nut 238. Similarly, receiving the nut 238 within the countersunk area 60 facilitates centering the nut 238 when tightened relative to the bolt 235. Centering the fastening assembly 232b helps reduce the likelihood of contact between the bolt 235 and the rib 218.

In this example, the bolt 235 defines a socket 62 configured to receive a ball fastener 64. The ball fastener 64 is connected to one of the linking members 22 through a second bolt 66. Using the ball fastener 64 and socket 62 facilitates movement of the linking member 22 relative to the rib 218. Also, in this example, no washer is positioned between the bolt head 236 and the felt metal gasket layer 244h, and no washer is positioned between the nut 238 and the foil layer 244n.

In another example, the fastening assembly 232b may include felt metal material extending through the aperture 234, as does the fastening assembly 132a (FIG. 8).

Figure 15:
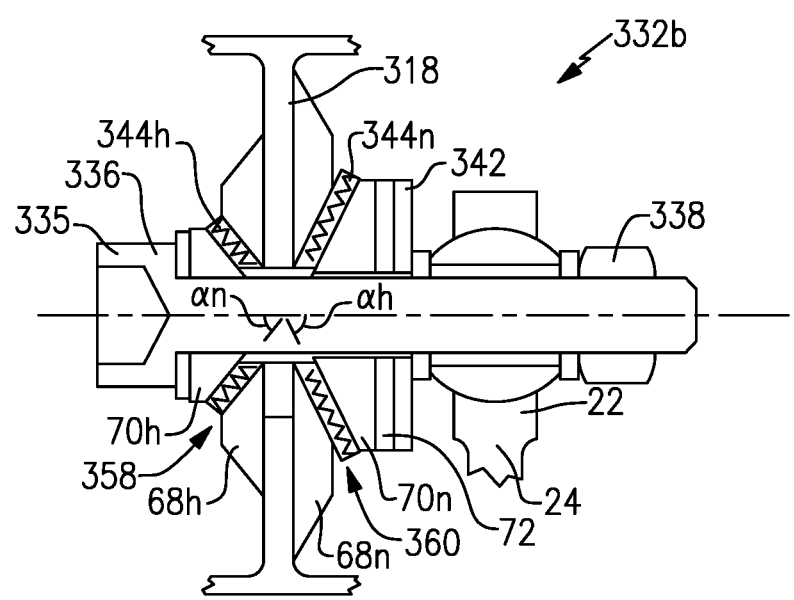
FIG. 15 shows a section view of yet another example mounting assembly that is partially conical.

Referring now to FIG. 15, a fastening assembly 332h may be used to secure the first ends 24 of the linking members 22. In this example, portions of the rib 318 include built up areas 68h that provide a countersunk area 358 that is used to accommodate a beveled washer 70h. The rib 318 also includes built-up areas 68n that provide a countersunk area 360 that is used to accommodate a beveled washer 70n.

In this example, the angle of the beveled area 70h is not the same as the angle of the beveled area 70n. More specifically, a bevel angle $\alpha_h$ of the head 336 is 45 degrees, and a bevel angle $\alpha_n$ of the nut 338 is 60 degrees.

In this example, tightening the bolt 335 relative to the nut 338 causes a flat washer 342 to compress against a wave spring washer 72, which moves the beveled portion of the head 336 axially toward nut 338 to compress the felt metal gasket material 344h and 344n.

Features of the disclosed examples include fastening assemblies that conform to surface irregularities and provide effective load distribution for securing to relatively brittle components. The fastening assemblies are particularly suitable for securing components having differing coefficients of thermal expansion.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of mounting a first component to a second component, comprising:

receiving at least a fastening assembly within an aperture established in the first component, the fastening assembly coupled to the second component via a linking member;

positioning a felt metal material between the fastening assembly and the first component;

securing the fastening assembly; and compressing the felt metal material during the securing.

2. The method of mounting of claim 1, wherein the positioning is before the receiving.

3. The method of mounting of claim 1, wherein the felt metal material is a non-woven metal felt gasket.

4. The method of mounting of claim 3, wherein the first component has a first coefficient of thermal expansion, and the second component has a second coefficient of thermal expansion.

5. The method of mounting of claim 4, wherein the first component is a ceramic matrix composite component.

6. The method of mounting of claim 3, wherein the first component is a ceramic matrix composite component.

7. The method of mounting of claim 3, further comprising receiving a split sleeve over at least a portion of the fastening assembly, the split sleeve configured to exert a force radially outward away from the fastening assembly to compress the non-woven metal felt gasket against the first component.

8. The method of mounting of claim 5, wherein the split sleeve includes an inner sleeve received within an outer sleeve.

9. The method of mounting of claim 6, wherein the inner sleeve having a facing end to face toward the outer sleeve, the outer sleeve having a facing end to face toward the inner sleeve, wherein the facing ends of the inner sleeve and the outer sleeve are beveled.

10. The method of mounting of claim 8, wherein the inner sleeve and the outer sleeve each include a slot to accommodate movement of the inner sleeve and the outer sleeve as the inner sleeve is received within the outer sleeve during assembly.

11. The method of mounting of claim 10, wherein the slot is a helical slot.

12. The method of mounting of claim 1, including separating the first component from the felt metal material using a foil layer.

13. The method of mounting of claim 12, wherein the foil layer is a compliant foil layer.

14. The method of mounting of claim 13, wherein the felt metal material is a non-woven metal felt gasket.

15. The method of mounting of claim 14, wherein the non-woven metal felt gasket lines the entire aperture.

16. The method of mounting of claim 14, wherein the foil layer includes a plurality of slices.

17. The method of mounting of claim 16, wherein the plurality of slices extend through the entire thickness of the foil layer.

18. The method of mounting of claim 1, wherein the first component has a first coefficient of thermal expansion, and the second component has a second coefficient of thermal expansion.

19. The method of mounting of claim 1, wherein the first component is a trailing edge aircraft component.

20. The method of mounting of claim 19, wherein the felt metal material is a non-woven metal felt gasket, and the trailing edge aircraft component is a ceramic matrix composite component.

* * * * *

UNITED STATES PATENT AND TRADEMARK OFFICE
CERTIFICATE OF CORRECTION

PATENT NO. : 10,669,007 B2 Page 1 of 1
APPLICATION NO. : 16/045008
DATED : June 2, 2020
INVENTOR(S) : Wendell V. Twelves and Kathleen E. Sinnamon It is certified that error appears in the above-identified patent and that said Letters Patent is hereby corrected as shown below:

In the Claims

In Claim 8, Column 6, Line 26; replace "claim 5" with --claim 7--

In Claim 9, Column 6, Line 29; replace "claim 6" with --claim 8--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*